(12) United States Patent
Burra et al.

(10) Patent No.: US 10,050,447 B2
(45) Date of Patent: Aug. 14, 2018

(54) MULTI-FARM WIND POWER GENERATION SYSTEM

(71) Applicant: General Electric Company, Schenectady, NY (US)

(72) Inventors: Rajni Kant Burra, Scotia, NY (US); Avijit Saha, Bangalore (IN); Venkatarao Ryali, Bangalore (IN); Govardhan Ganireddy, Bangalore (IN); Akshay Krishnamurty Ambekar, Bangalore (IN); Deepak Raj Sagi, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 111 days.

(21) Appl. No.: 14/782,397

(22) PCT Filed: Mar. 26, 2014

(86) PCT No.: PCT/US2014/031838
§ 371 (c)(1),
(2) Date: Oct. 5, 2015

(87) PCT Pub. No.: WO2014/165366
PCT Pub. Date: Oct. 9, 2014

(65) Prior Publication Data
US 2016/0049792 A1    Feb. 18, 2016

(30) Foreign Application Priority Data

Apr. 4, 2013    (IN) ........................... 1538/CHE/2013

(51) Int. Cl.
*H02J 1/10*    (2006.01)
*H02J 3/38*    (2006.01)
(Continued)

(52) U.S. Cl.
CPC .............. *H02J 3/386* (2013.01); *F03D 7/048* (2013.01); *F03D 9/257* (2017.02);
(Continued)

(58) Field of Classification Search
CPC .... H02J 3/386; H02J 13/0079; H02J 13/0086; H02J 3/48; H02J 3/50; H02J 13/0062;
(Continued)

(56) References Cited

U.S. PATENT DOCUMENTS 6,924,565 B2 *  8/2005  Wilkins ................... F03D 7/02
                                                          290/44
6,925,385 B2    8/2005  Ghosh et al.
(Continued)

FOREIGN PATENT DOCUMENTS

CN    102077437 A    5/2011
CN    102496966 A    6/2012
(Continued)

OTHER PUBLICATIONS

Smith et al., "Interconnection Studies for Wind Generation", Rural Electric Power Conference, pp. C3-1-8, May 23-25, 2004.
(Continued)

*Primary Examiner* — Kenneth B Wells
(74) *Attorney, Agent, or Firm* — Douglas D. Zhang; GE Global Patent Operation (57) ABSTRACT

A multi-farm wind power dispatch management system is provided which includes wind turbine dispatch controllers for controlling wind power dispatch of respective wind farm components and wind farm dispatch management systems for receiving respective wind farm component operating parameters and generating respective farm-level operating parameters. The system also includes group dispatch management systems for receiving the farm-level operating parameters and generating respective group level operating
(Continued)

parameters. The system also includes a master dispatch management system for receiving the group-level operating parameters; computing a real time output power generated by the wind farm components; determining a difference between the real time output power and a committed output power; and generating reference commands, based on the difference, for controlling at least one of, the wind farm component operating parameters, the farm-level operating parameters, the group level operating parameters, or combinations thereof to reduce the difference and dispatch the committed output power.

16 Claims, 6 Drawing Sheets (51) Int. Cl.
*F03D 7/04* (2006.01)
*H02J 3/48* (2006.01)
*H02J 3/50* (2006.01)
*G05B 19/042* (2006.01)
*F03D 9/25* (2016.01)
*H02J 13/00* (2006.01)

(52) U.S. Cl.
CPC ............ *G05B 19/0421* (2013.01); *H02J 3/48* (2013.01); *H02J 3/50* (2013.01); *H02J 13/0079* (2013.01); *H02J 13/0086* (2013.01); *F05B 2260/8211* (2013.01); *G05B 2219/1215* (2013.01); *G05B 2219/2619* (2013.01); *H02J 13/0062* (2013.01); *Y02E 10/723* (2013.01); *Y02E 10/763* (2013.01); *Y02E 40/72* (2013.01); *Y02E 60/7838* (2013.01); *Y04S 10/123* (2013.01); *Y04S 40/124* (2013.01)

(58) Field of Classification Search
CPC ..... F03D 9/257; F03D 7/048; G05B 19/0421; G05B 2219/2619; G05B 2219/1215; Y02E 40/72; Y02E 10/723; Y02E 10/763; Y02E 60/7838; Y04S 10/123; Y04S 40/124; F05B 2260/8211
USPC .......................................................... 290/44
See application file for complete search history.

(56) References Cited

U.S. PATENT DOCUMENTS

| | | | |
|---|---|---|---|
| 7,013,203 B2 | 3/2006 | Moore et al. | |
| 7,119,452 B2* | 10/2006 | Larsen .................... | F03D 9/257 290/44 |
| 7,462,947 B2* | 12/2008 | Wobben ................ | F03D 7/0284 290/44 |
| 7,505,833 B2* | 3/2009 | Delmerico ............... | H02J 3/16 700/291 |
| 7,531,911 B2 | 5/2009 | Rivas et al. | |
| 7,649,282 B2 | 1/2010 | Jurkat et al. | |
| 7,679,215 B2 | 3/2010 | Delmerico et al. | |
| 7,805,222 B2 | 9/2010 | Jurkat | |
| 7,839,024 B2* | 11/2010 | Cardinal ............... | F03D 7/0284 307/153 |
| 7,941,246 B2 | 5/2011 | Miller et al. | |
| 7,979,167 B2* | 7/2011 | Delmerico ............... | H02J 3/16 700/291 |
| 8,046,110 B2 | 10/2011 | Mayor et al. | |
| 8,265,798 B2 | 9/2012 | Imes | |
| 8,694,171 B2* | 4/2014 | Ichinose ................. | F03D 7/048 290/44 |
| 8,694,173 B2* | 4/2014 | Lovmand ............... | F03D 7/028 290/44 |
| 8,880,228 B2* | 11/2014 | Kumar ...................... | H02J 3/26 290/44 |
| 9,046,077 B2* | 6/2015 | Kirchner ............... | F03D 7/0284 |
| 9,203,333 B2* | 12/2015 | Larsen ...................... | F03D 7/00 |
| 9,318,988 B2* | 4/2016 | Larsen ...................... | F03D 7/00 |
| 9,473,057 B2 | 10/2016 | Burra et al. | |
| 2002/0084655 A1 | 7/2002 | Lof et al. | |
| 2008/0174180 A1 | 7/2008 | Jurkat et al. | |
| 2009/0027002 A1 | 1/2009 | Stahlkopf | |
| 2009/0102195 A1 | 4/2009 | Altemark et al. | |
| 2009/0281675 A1 | 11/2009 | Rasmussen et al. | |
| 2010/0145533 A1 | 6/2010 | Cardinal et al. | |
| 2010/0274399 A1 | 10/2010 | Alonso et al. | |
| 2010/0274401 A1 | 10/2010 | Kjaer et al. | |
| 2011/0166717 A1 | 7/2011 | Yasugi | |
| 2012/0010755 A1 | 1/2012 | Stapelfeldt | |
| 2012/0019516 A1 | 1/2012 | Park et al. | |
| 2012/0150361 A1 | 6/2012 | Lazaris | |

FOREIGN PATENT DOCUMENTS

| | | | | |
|---|---|---|---|---|
| CN | 102606395 A | | 7/2012 | |
| CN | 102736593 A | | 10/2012 | |
| EP | 2175540 | * | 4/2010 | ............... H02J 3/16 |
| WO | 2009083446 A2 | | 7/2009 | |

OTHER PUBLICATIONS

El-Fouly, "Wind Farms Production: Control and Prediction", Thesis (Ph. D.)—University of Waterloo, 2007.

Georgilakis, "Technical Challenges Associated with the Integration of Wind Power into Power Systems", Renewable and Sustainable Energy Reviews, vol. 12, Issue 3, pp. 852-863, Apr. 2008.

Zhang et al., "Wind Power Availability and Increased Capacity Credit for Multiple Wind Farms", IEEE Power and Energy Society General Meeting, pp. 1-7, Jul. 25-29, 2010.

Xu et al., "Real-Time Dispatching and Coordinated Control of Large Capacity Wind Power Integration", International Conference on Advanced Power System Automation and Protection (APAP), vol. 1, pp. 49-53, Oct. 16-20, 2011.

Wu et al., "Multiple Time-Scale Coordinated Power Control System to Accommodate Significant Wind Power Penetration and its Real Application", IEEE Power and Energy Society General Meeting, pp. 1-6, Jul. 22-26, 2012.

International Search Report and Written Opinion issued in connection with corresponding PCT Application No. PCT/US2014/031838 dated Aug. 20, 2014.

Unofficial English Translation of Chinese Office Action issued in connection with corresponding CN Application No. 201480032140.5 dated Jun. 1, 2017.

EP Office Action issued in connection with corresponding EP Application No. 14725293.6 dated Jun. 6, 2017.

* cited by examiner

MULTI-FARM WIND POWER GENERATION SYSTEM

BACKGROUND

Embodiments of the invention generally relate to a power generation system and, more particularly, to a system and method for controlling a wind power generation system.

A wind farm includes wind turbines spread over a large area of land that harness wind energy to generate power for utility purposes. The wind farm is coupled to a grid and is expected to provide a committed or forecasted amount of power at a fixed power rating to the grid. However, due to the uncontrollable variations in the wind energy, such as wind speed, it is difficult to continuously provide the committed amount of power at the fixed power ratings, and there is always some difference between the power supplied from the wind farm and the committed amount of power.

One approach for compensation in a situation where the wind farm is unable to supply the committed power is to buy power from neighboring reserve generators. Another approach is to use supplementary energy storage in the wind farm. However, each of these approaches increases cost of power generated by the wind farm and thus results in higher costs to consumers or losses to power generation organizations. For example, the use of supplementary energy storage creates additional installation, operating, and maintenance costs.

Hence, there is a need for an improved system to address the aforementioned issues.

BRIEF DESCRIPTION

Briefly, in accordance with one embodiment, a multi-farm wind power dispatch management system is provided. The multi-farm wind power dispatch management system includes wind turbine dispatch controllers for controlling wind power dispatch of respective wind farm components in respective wind farms based at least in part on wind farm component operating parameters. The multi-farm wind power dispatch management system also includes wind farm dispatch management systems for receiving respective wind farm component operating parameters and generating respective farm-level operating parameters. The multi-farm wind power dispatch management system further includes group dispatch management systems for receiving the farm-level operating parameters and generating respective group level operating parameters, wherein each of the group dispatch management systems is coupled to at least two respective wind farm dispatch management systems of at least two respective wind farms having a respective point of common coupling with a power grid. The multi-farm wind power dispatch management system also includes a master dispatch management system that executes the steps of receiving the group-level operating parameters, computing a real time output power generated by the wind farm components based on the group-level operating parameters, determining a difference between the real time output power and a committed output power; and generating reference commands, based on the difference, for controlling at least one of, the wind farm component operating parameters, the farm-level operating parameters, the group level operating parameters, or combinations thereof to reduce the difference and dispatch the committed output power.

In another embodiment, a method for dispatching wind power is provided. The method includes the steps of using wind parameters to estimate a committed output power representative of a sum of individual output power expected from a plurality of wind farms for a time interval, receiving operating parameters from wind farm components in the wind farms, generating farm-level operating parameters for the wind farms by aggregating the operating parameters of the wind farm components of respective wind farms, and computing group-level operating parameters by aggregating farm-level operating parameters of respective ones of the wind farms that are coupled to respective points of common coupling. The method further includes computing a real time output power generated by the wind farm components based on the group-level operating parameters, determining a difference between the real time output power and the committed output power, generating reference commands, based on the difference, for controlling the operating parameters of the wind farm components for generating a reserve power for reducing the difference, and transmitting the reference commands to the wind turbine components for dispatching the real time power and the reserve power.

In yet another embodiment, a multi-farm wind power dispatch management system is provided. The multi-farm wind power dispatch management system includes wind turbine dispatch controllers for controlling a wind power dispatch of respective wind farm components in respective wind farms based at least in part on wind farm component operating parameters. The multi-farm wind power dispatch management system also includes wind farm dispatch management systems for receiving operating parameters and generating respective farm-level operating parameters. The multi-farm wind power dispatch management system further includes a master dispatch management system for carrying out the steps of receiving farm-level operating parameters from each of the wind farm dispatch management systems, computing a real time output power generated by the wind farm components based on the farm-level operating parameters, determining a difference between the real time output power and a committed output power, and generating reference commands, based on the difference, for controlling at least one of, the wind farm component operating parameters, the farm-level operating parameters or a combination thereof to reduce the difference and dispatch the committed output power.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a multi-farm wind power dispatch management system that includes wind turbine dispatch controllers for controlling wind power dispatch of respective wind farm components in respective wind farms based at least in part on wind farm component operating parameters. The multi-farm wind power dispatch management system also includes wind farm dispatch management systems for receiving respective wind farm component operating parameters and generating respective farm-level operating parameters. The multi-farm wind power dispatch management system further includes group dispatch management systems for receiving the farm-level operating parameters and generating respective group level operating parameters, wherein each of the group dispatch management systems is coupled to at least two respective wind farm dispatch management systems of at least two respective wind farms having a respective point of common coupling with a power grid. The multi-farm wind power dispatch management system also includes a master dispatch management system that executes the steps of receiving the group-level operating parameters, computing a real time output power generated by the wind farm components based on the group-level operating parameters, determining a difference between the real time output power and a committed output power; and generating reference commands, based on the difference, for controlling at least one of, the wind farm component operating parameters, the farm-level operating parameters, the group level operating parameters, or combinations thereof to reduce the difference and dispatch the committed output power.

Figure 1:
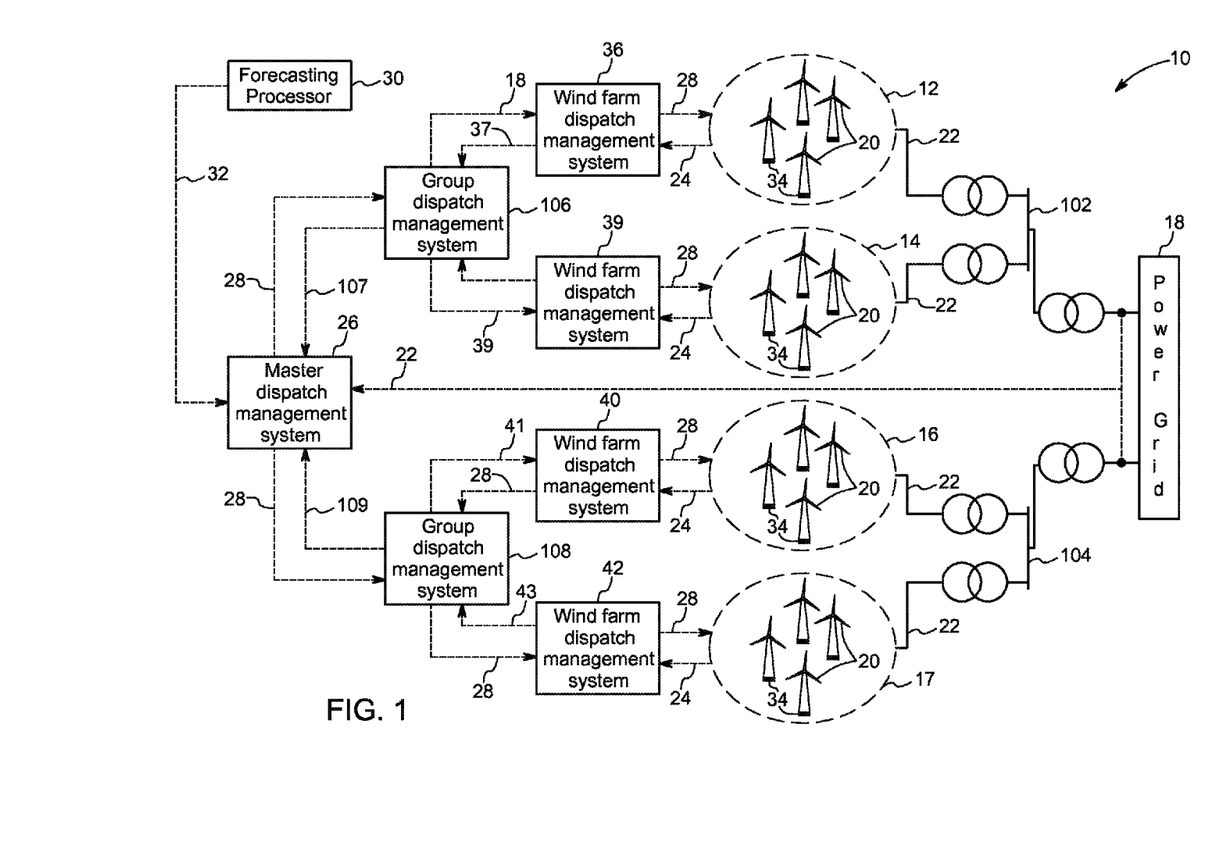
FIG. 1 is a schematic representation of an exemplary multi farm wind power dispatch management system in accordance with an embodiment of the invention.

FIG. 1 is a schematic representation of an exemplary multi farm wind power dispatch management system 10 including two points of common coupling 102, 104 and two group dispatch management systems 106, 108 in accordance with an embodiment of the invention. The multi farm wind power dispatch system 10 includes wind farms 12, 14, 16, 17 that are coupled to a power grid 18 via the two points of common coupling 102 and 104. The wind farms 12, 14 are coupled to the point of common coupling 102, and the wind farms 116 and 117 are coupled to the point of common coupling 104. Each of the wind farms 112, 114, 116, 117 includes wind farm components 20 that generate output power 22.

The wind farms 12, 14 and 16, 17 also include wind turbine dispatch controllers 34 that control wind power dispatch of wind farm components 20 in the respective wind farms 12, 14, 16, 17 based at least in part on wind farm component operating parameters 24. The wind turbine dispatch controllers 34 of wind farms 12, 14, 16, 17 are communicatively coupled to wind farm dispatch management systems 36, 38, 40, 42 respectively and receive the wind farm component operating parameters 24 from each wind farm component 20 in the respective wind farms 12, 14, 16, 17. The wind farm dispatch management systems 36, 38, 40, 42 generate respective farm-level operating parameters 37, 39, 41, 43 for the wind farms 12, 14, 16, 17 respectively by aggregating the wind farm component operating parameters 24 of each wind farm 12, 14, 16, 17. As used herein "aggregating" means creating a set of all wind farm operating parameters received from each wind farm 12, 14, 16, 17.

The multi farm wind power dispatch management system 10 further includes group dispatch management systems 106, 108 that receive the farm level operating parameters 37, 39, 41, 43 from each of the wind farm dispatch management systems 36, 38, 40, 42 and generate respective group level operating parameters 107 and 109. Notably, the number of group dispatch management systems is equal to the number of points of common coupling in the power grid, and each group dispatch management system is coupled to the wind farm dispatch management systems of the respective wind farms coupled to the respective points of common coupling. For example, wind farms 12, 14 are coupled to the point of common coupling 102, and the respective wind farm dispatch management systems 36, 38 of wind farms 12, 14 are coupled to the group dispatch management system 106. Similarly, wind farms 16, 17 are coupled to the point of common coupling 104, and the respective wind farm dispatch management systems 40, 42 are coupled to the group dispatch management system 108. The group dispatch management system 106 generates the group level operating parameters 107 by aggregating the farm-level operating parameters 37, 39 of the wind farms 12, 14, and the group dispatch management system 108 generates the group level operating parameters 109 by using the farm level operating parameters 41, 43 of the wind farm 16.

The group dispatch management systems 106, 108 are coupled to a master dispatch management system 26 in the multi farm wind dispatch management system 10. The master dispatch management system 26 receives the group level operating parameters 107, 109 from the respective group dispatch management systems 106, 108 and, in one embodiment, also receives a signal 32 representative of the committed output power from a forecasting processor 30 communicatively coupled to the master dispatch management system 26. The forecasting processor 30 determines an estimated output power that should be generated by the individual wind farms 12, 14, 16, 17 if operating at full capacity based on a wind forecast for a predefined interval and further computes an aggregate of the individual estimated output power to determine the committed output power. The master dispatch management system 26 determines a real time output power 22 that is generated by the wind farm components 20 and computes a difference between the committed output power and the real time output power 22. As used herein, the term "output power 22" is used interchangeably with "real time output power 22". The master dispatch management system 26 generates reference commands 28 based on the difference, that are used to control at least one of, the wind farm component operating parameters 24, the farm-level operating parameters 37, 39, 41, 43, the group level operating parameters 107, 109, or combinations thereof to reduce the difference and dispatch the committed output power.

Figure 2:
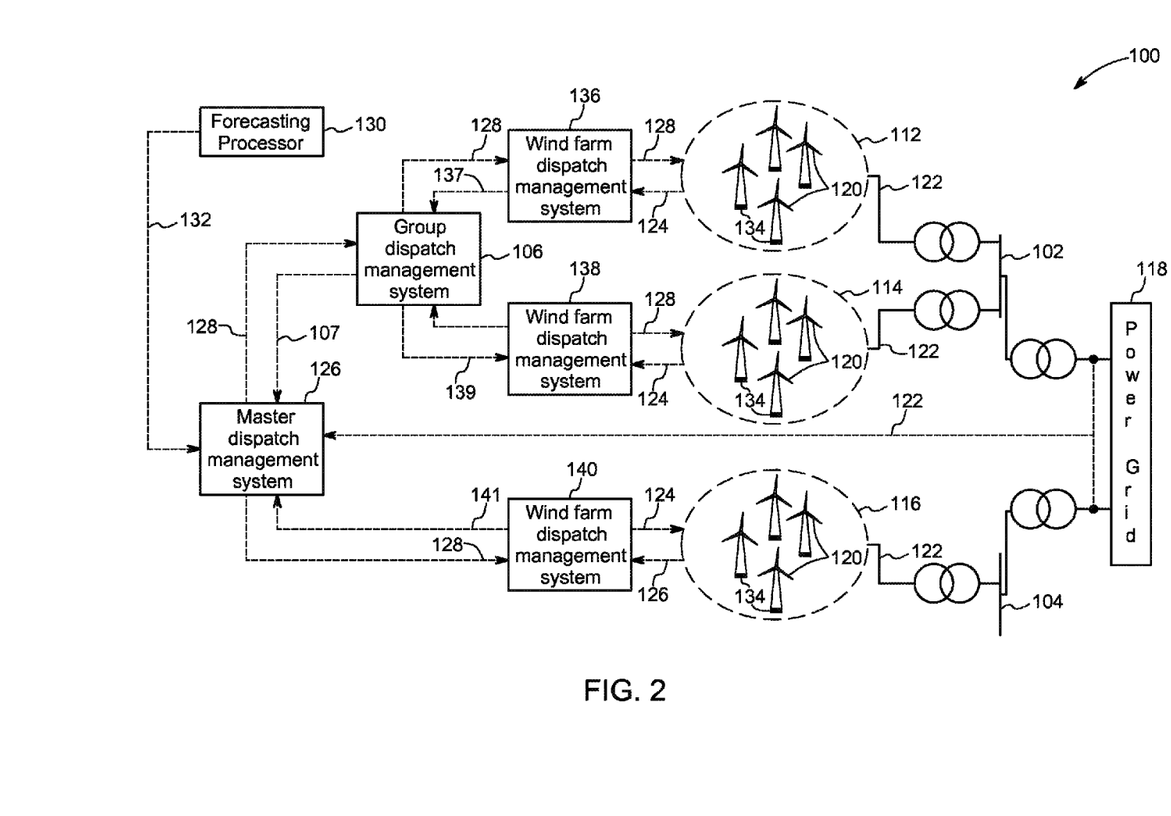
FIG. 2 is a schematic representation of an alternative embodiment of an exemplary multi farm wind power dispatch management system in accordance with an embodiment of the invention.

FIG. 2 is a schematic representation of an alternative embodiment of an exemplary multi farm wind power dispatch management system 100 including the two points of common coupling 102, 104 and one group dispatch management system 106 in accordance with an embodiment of the invention. The multi farm wind power dispatch system 100 includes wind farms 112, 114, 116 that are coupled to a power grid 118 via two points of common coupling 102 and 104. The wind farms 112, 114 are coupled to the point of common coupling 102 and the wind farm 116 is coupled to the point of common coupling 104. Each of the wind farms 112, 114, 116 includes wind farm components 120 that generate output power 122 and transmit the output power 122 to the power grid 118.

The wind farms 112, 114 and 116 also include wind turbine dispatch controllers 134 that control wind power dispatch of wind farm components 120 in the respective wind farms 112, 114, 116 based at least in part on wind farm component operating parameters 124. The wind turbine dispatch controllers 134 of wind farms 112, 114, 116 are communicatively coupled to wind farm dispatch management systems 136, 138, 140 respectively and receive the wind farm component operating parameters 124 from each wind farm component 120 in the respective wind farms 112, 114, 116. The wind farm dispatch management systems 136, 138, 140 generate respective farm-level operating parameters 137, 139, 141 for the wind farms 112, 114, 116 respectively by aggregating the wind farm component operating parameters 124 of each wind farm 112, 114, 116.

The multi farm wind power dispatch management system 100 further includes group dispatch management system 106 that receives the farm level operating parameters 137, 139 from the wind farm dispatch management systems 136, 138 and generates a respective group level operating parameter 107. The group dispatch management system 106 generates the group level operating parameters 107 by aggregating the farm-level operating parameters 137, 139 of the wind farms 112, 114.

The multi farm wind dispatch management system 100 also includes a master dispatch management system 126 which is coupled to the group dispatch management system 102 and the wind farm dispatch management system 140. The multi farm wind dispatch management system 100 does not include the second group dispatch management system 108 (FIG. 1) because only one wind farm 116 is coupled to the point of common coupling 104. The master dispatch management system 100 receives the group level operating parameters 107 from the group dispatch management system 102 and the farm level operating parameters from the wind farm dispatch management system 140 and also receives a signal 132 representative of the committed output power from a forecasting processor 130 communicatively coupled to the master dispatch management system 126. The forecasting processor 130 determines an estimated output power that may be generated by the individual wind farms 112, 114, 116 while operating at full capacity based on a wind forecast for a predefined interval and further computes an aggregate of the individual estimated output power to determine the committed output power. The master dispatch management system 126 determines a real time output power 122 that is generated by the wind farm components 120 and computes a difference between the committed output power and the real time output power 122. The master dispatch management system 126 generates reference commands 128 based on the difference, that are used to control at least one of, the wind farm component operating parameters 124, the farm-level operating parameters 137, 139, 141, the group level operating parameters 107, or combinations thereof to reduce the difference and dispatch the committed output power.

Figure 3:
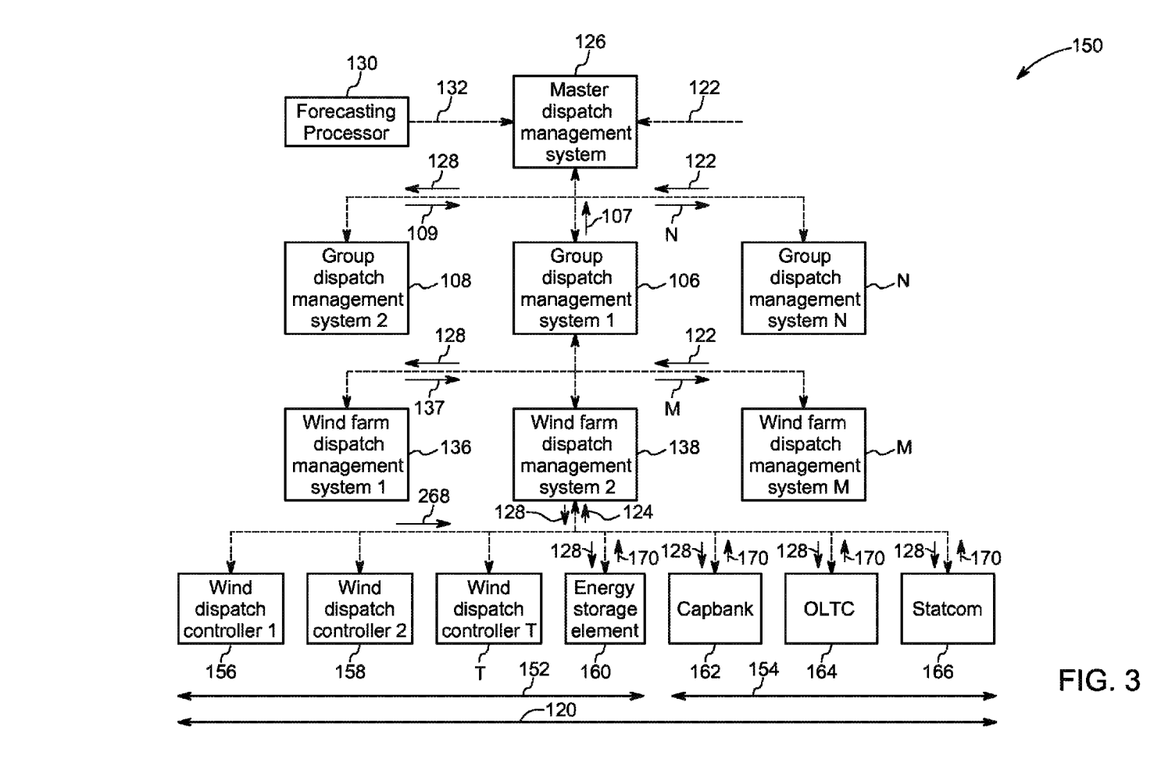
FIG. 3 is a block diagram representation of a control system structure in an exemplary multi farm wind power dispatch management system in accordance with an embodiment of the invention.

FIG. 3 is a block diagram representation of a control system structure of an exemplary multi farm wind power dispatch management system 150 including N number of group dispatch management systems, M number of wind farm dispatch management systems, and T number of wind dispatch controllers depicting a directional flow of various operating parameters and reference commands between each other in accordance with an embodiment of the invention. The multi farm wind power dispatch management system 150 includes wind farms 112, 114 (FIG. 1) . . . M and each wind farm 112, 114 . . . M includes wind farm components 120 for generating output power. In one embodiment, the wind farm components 120 include at least one of active power components 152 and reactive power components 154. In a more specific embodiment, the active power components 152 include wind turbines and energy storage elements 160 and the reactive power components 154 include at least one of static synchronous compensators (STATCOM), capacitor banks, on-load tap changers (OLTC) or a combination thereof. In one embodiment, the energy storage element 160 includes a battery. For illustration purposes, the wind farm components 120 of a single wind farm 114 are only shown.

The wind farm components 120 in the wind farm 114 include T number of wind turbines (including T number of dispatch controllers 156, 158, . . . T) and the energy storage element 160 for providing active power. The wind farm components 120 also include capacitor bank 162, on load tap changers (OLTC) 164, and static synchronous compensators (STATCOM) 166 for providing reactive power. The wind farm components 120 provide wind farm components operating parameters 124 to the wind farm dispatch management system 138. In one embodiment, the wind farm components operating parameters 124 include active power operating parameters 168 and reactive power operating parameters 170. The active power operating parameters 168 are received from the wind dispatch controllers 156, 158 . . . T coupled to respective wind turbines and from the energy storage element 160. In one embodiment, the active power operating parameters include actual wind power operating parameters, a transient wind farm reserve, and a storage reserve. The respective wind dispatch controllers 156, 158, . . . T transmit the actual wind power operating parameters to the wind farm dispatch management system 138. In a more specific embodiment, the actual wind power operating parameters represent voltage parameter and current parameter of each of the wind turbines. The energy storage element 160 includes an energy storage management system (not shown) that transmits a storage reserve parameter 172 to the wind farm dispatch management system 138. The wind farm dispatch management system 138 receives the actual wind power operating parameters from the wind dispatch controllers 156, 158, . . . T and computes the transient wind farm reserve. In one embodiment, the wind farm dispatch management system 138 computes the transient wind farm reserve further based on a wind forecast received from the forecasting processor 130. The transient wind farm reserve may comprise a reserve power that may be generated by enhancing the power output of the wind turbines, a reserve power available by using the kinetic energy of the wind turbines, a reserve power that is available by using one or more curtailed wind turbines, or combinations thereof.

The wind farm dispatch management system 138 further receives the reactive power operating parameters 170 for the respective wind farm from the reactive power components 154. The reactive power components 154 including the capacitor banks, the OLTC and the STATCOM provide the real time status of their operation such as including but not limited to reactive voltage parameters and reactive current parameters. The wind farm dispatch management system 138 aggregates the active power operating parameters 168 and the reactive power operating parameters 170 and generates the farm-level operating parameters 139. In one embodiment, the farm level operating parameters 139 include aggregated active power operating parameters 168 and aggregated reactive power operating parameters 170 of the wind farm components of the respective wind farms 112, 114, 116. Similarly, the remaining wind farm dispatch management systems 136, . . . M receive the active power operating parameters from the respective active wind farm components and the reactive operating parameters from the respective reactive wind farm components and generate the farm level operating parameters.

The wind farm dispatch management systems 136, 138, . . . M transmit the farm level operating parameters to the respective group dispatch management systems 106, 108, . . . N. As described above, each of the group dispatch management system 106, 108, . . . N corresponds to a respective point of common coupling 102, 104, . . . N and is coupled to the wind farm dispatch management systems of the wind farms coupled to the respective point of common coupling 102, 104, . . . N. There are N number of points of common coupling that may be coupled to the power grid and each point of common coupling includes M number of wind farms coupled to the respective point of common coupling. For ease of illustration, the operations of the group dispatch management system are discussed with respect to one group dispatch management system 106 which can be applied similarly to other group dispatch management systems 106, 108, . . . N in the multi farm wind dispatch management system 150. The wind farms 112, 114 (FIG. 1) are coupled to the point of common coupling 102 (FIG. 1). Although two wind farms are shown in FIG. 1, M number of wind farms may be coupled to the point of common coupling 102. The group dispatch management system 106 receives the farm level operating parameters 139 from the wind farm dispatch management systems 136, 138, . . . M to generate the group level operating parameter 107 by aggregating the farm level operating parameters 137, 139 . . . M. In a more specific embodiment, the group level operating parameters 107 includes an aggregated farm-level operating parameters 137, 139 . . . M of the wind farms 136, 138 . . . M coupled to the respective point of common coupling 106. Similarly, each of the group dispatch management systems 108, . . . N generate respective group level operating parameters and transmit the group level operating parameters to the master dispatch management system 126.

The master dispatch management system 126 is coupled to the forecasting processor 130 that provides the signal 132 representative of the committed output power to the master dispatch management system 126 as estimated by the forecasting processor 130. The master dispatch management system 126 may also receive a pilot bus voltage and a grid frequency from the power grid 118 (FIG. 1). The master dispatch management system 126 computes the real time output power 122 that may be generated by the wind farm components based on the group level operating parameters 107, 109, . . . N and determines a difference between the committed power 132 and the real time output power 122. The master dispatch management system 126 uses the difference, the pilot bus voltage, and the grid frequency to generate the reference commands 128 to reduce the difference and provide the committed output power.

In one embodiment, the master dispatch management system 126 identifies a method with which the difference can be reduced based on the group level operating parameters 107, 109, . . . N. In this embodiment, the method may include at least one of, providing a transient reserve for reducing the difference, using the storage reserve for reducing the difference, using the reactive power components for reducing the difference or a combination thereof In a more specific embodiment, the master dispatch management system 126 first dispatches the transient wind farm reserve to reduce the difference, if the transient wind farm reserve is insufficient to reduce the difference, additionally or alternatively dispatching the storage reserve, and if the transient wind farm reserve and the storage reserve are insufficient to reduce the difference, additionally or alternatively dispatching the reactive power to reduce the difference.

The master dispatch management system 126 generates the reference commands 128 based on the above identified methods and transmits the reference commands 128 to the group dispatch management systems 106, 108, . . . N. In one embodiment, these reference commands 128 may be sent to group dispatch management system 106 which in turn determines reference commands for its respective wind farm dispatch management systems and/or wind farm components. In another embodiment, the master dispatch management system itself may calculate reference commands to be transmitted to the wind farm components.

In one example, whether sent directly from the master dispatch management system or a lower level system, the reference commands 128 provided to the wind farm components include set points for the wind farm components. The wind farm components receive the reference commands 128 and accordingly modify respective operating parameters 124 based on the set points provided by the reference commands 128 to provide output power 122 to reduce the difference in the multi farm wind dispatch management system 150.

Figure 4:
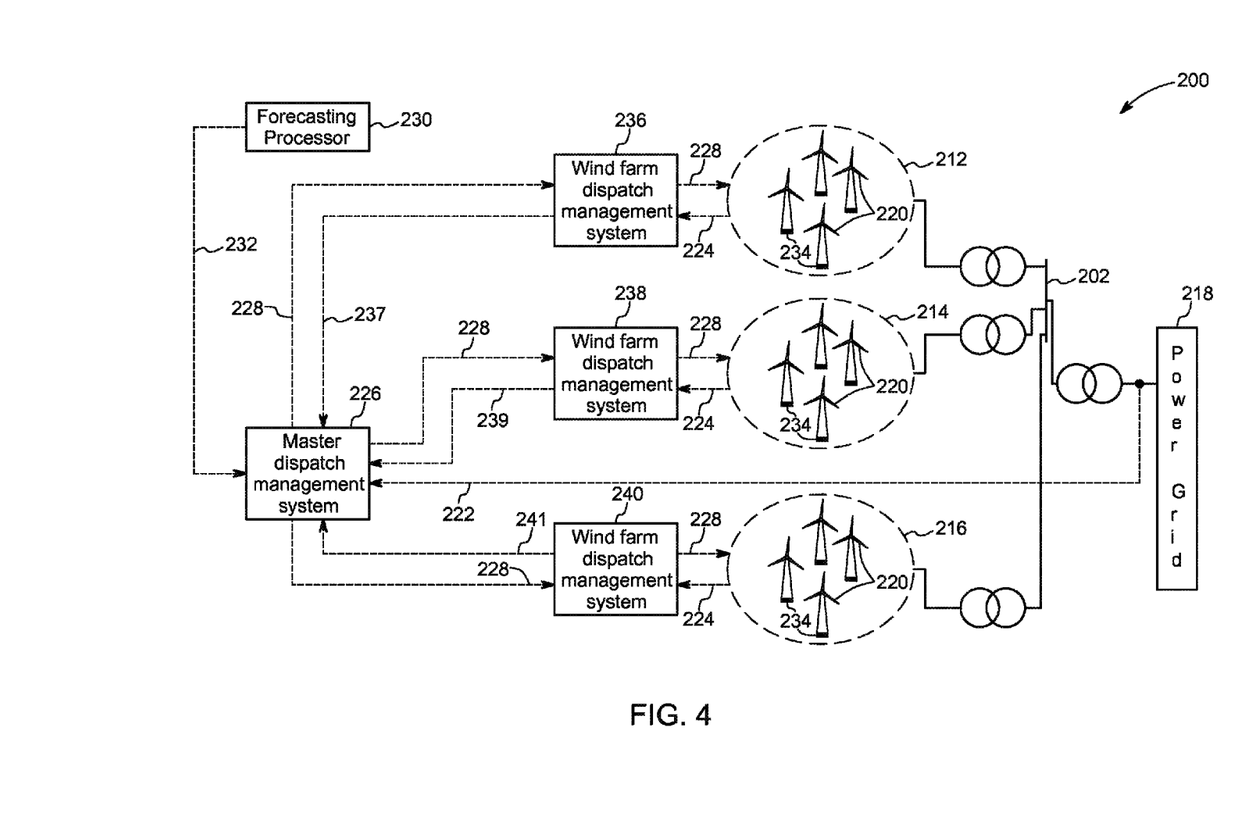
FIG. 4 is a schematic representation of an alternative embodiment of an exemplary multi farm wind power dispatch management system in accordance with an embodiment of the invention.

FIG. 4 is a schematic representation of an exemplary multi farm wind power dispatch management system 200 including one point of common coupling 202 in accordance with an embodiment of the invention. In some embodiments, the multi farm wind power dispatch management system 200 includes wind farms 212, 214, 216 including wind farm components 220, coupled to the point of common coupling 202. In such embodiments, the wind dispatch controllers 234 transmit wind farm component operating parameters 224 to the wind farm dispatch management systems 236, 238, 240 which further transmit the farm level operating parameters 237, 239, 241 directly to a master dispatch management system 226 without an intermediate group dispatch management system (FIG. 3). The farm level operating parameters 237, 239, 241 are transmitted to the master dispatch management system 226 which aggregates the farm level operating parameters 237, 239, 241 and generates reference commands 228 based at least on the aggregated farm level operating parameters and committed power 232 received from a forecasting processor 230 for reducing a difference between the committed power 232 and a real time output power 222 provided to a power grid 218 by the wind farms 212, 214, 216.

Figure 5:
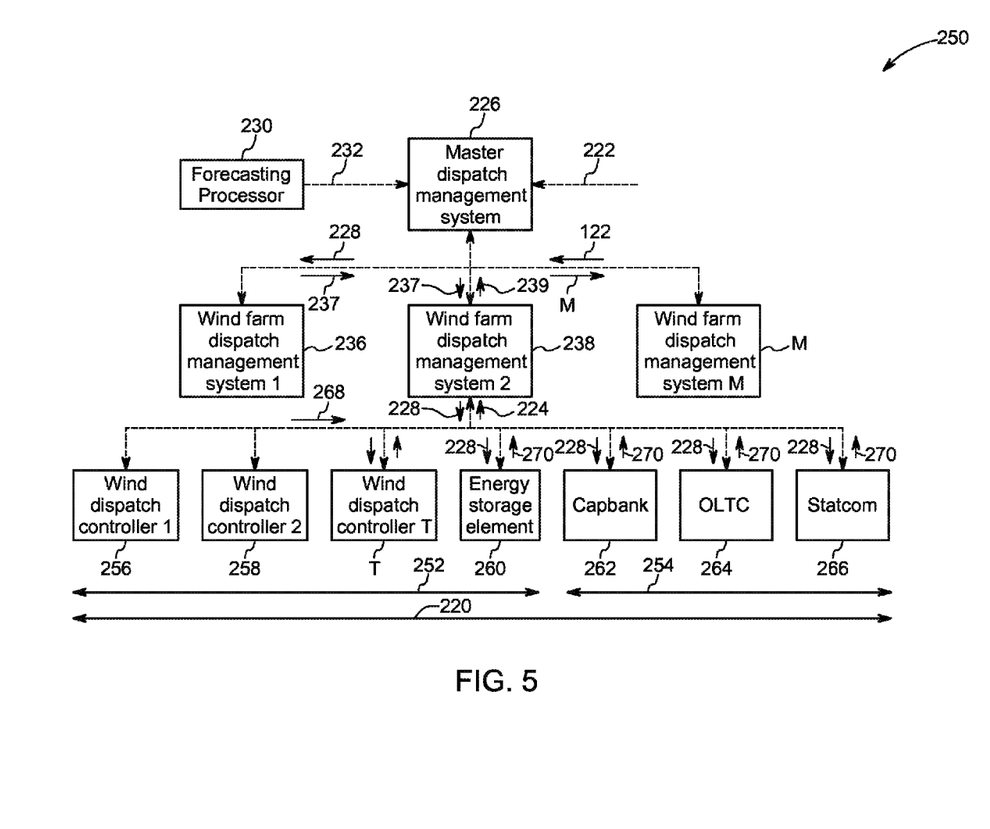
FIG. 5 is a block diagram representation of a control system structure in accordance with another embodiment of the invention.

FIG. 5 is a block diagram representation of a controls system structure in an exemplary multi farm wind power dispatch management system 250 including M number of wind farm dispatch management systems and T number of wind dispatch controllers depicting a directional flow of various operating parameters and reference commands between each other in accordance with an embodiment of the invention. The multi farm wind power dispatch management system 250 includes wind farms 212, 214, . . . M (FIG. 4), and each wind farm 212, 214, . . . M includes wind farm components 220 for generating output power. In one embodiment, the wind farm components 220 include at least one of active power components 252 and reactive power components 254. For illustration purposes, the wind farm components 220 of the wind farm 214 are shown and described below.

The wind farm components 220 in the wind farm 214 include T number of wind turbines and the energy storage element 260 for providing active power. The wind farm components 220 also include a capacitor bank 262, on-load tap changers (OLTC) 264 and static synchronous compensators (STATCOM) 266 for providing reactive power. The wind farm components 220 provide wind farm components operating parameters 224 to the wind farm dispatch management system 238. In one embodiment, the wind farm components operating parameters 224 include active power operating parameters 268 and reactive power operating parameters 270. The active power operating parameters 268 are received from the wind dispatch controllers 256, 258 . . . T coupled to respective wind turbines and the energy storage element. In one embodiment, the active power operating parameters 268 include actual wind power operating parameters, a transient wind farm reserve, and a storage reserve. The wind farm dispatch management system 238 receives the actual wind power operating parameters from the wind dispatch controllers 256, 258, . . . T and computes the transient wind farm reserve as described with respect to FIG. 3.

The wind farm dispatch management system 238 further receives the reactive power operating parameters 270 for the respective wind farm from the reactive power components 254. The wind farm dispatch management system 238 aggregates the active power operating parameters 268 and the reactive power operating parameters 270 and generates the farm-level operating parameters 239. Similarly, the remaining wind farm dispatch management systems 236, . . . M receive the active power operating parameters from the respective active wind farm components and the reactive power operating parameters from the respective reactive wind farm components and generate the farm level operating parameters.

The wind farm dispatch management systems 236, 238, . . . M transmit the farm level operating parameters to the master dispatch management system 226 which is coupled to the forecasting processor 230 that provides the signal 232 representative of the committed output power to the master dispatch management system 226 as estimated by the forecasting processor 230. In one embodiment, the master dispatch management system 226 also receives a pilot bus voltage and a grid frequency from the power grid 218 (FIG. 4). The master dispatch management system 226 computes the real time output power 222 that may be generated by the wind farm components based on the farm level operating parameters 237, 239, . . . M and determines a difference between the committed power 232 and the real time output power 222. The master dispatch management system 226 uses the difference, the pilot bus voltage, and the grid frequency to generate the reference commands 228 to reduce the difference and provide the committed output power. In one embodiment, the master dispatch management system 226 identifies a method with which the difference can be reduced based on the farm level operating parameters 237, 239, . . . M. The method may include, for example, at least one of, providing a transient reserve for reducing the difference, using the storage reserve for reducing the difference, using the reactive power components for reducing the difference or a combination thereof. The master dispatch management system 226 generates the reference commands 228 based on the above identified methods and transmits the reference commands 228 to the respective wind farm dispatch management systems 236, 238, . . . M and which further transmits (either directly or after further calculations at the master dispatch management system) reference commands to the wind dispatch controllers 256, 258 . . . T of the wind turbines, energy storage elements and/or to the reactive power components in the respective wind farms. The wind farm components 220 receive the reference commands 228 and accordingly modify respective operating parameters based on the set points received from the reference command 228 to provide output power 222 to reduce the difference in the multi farm wind dispatch management system 250.

Figure 6:
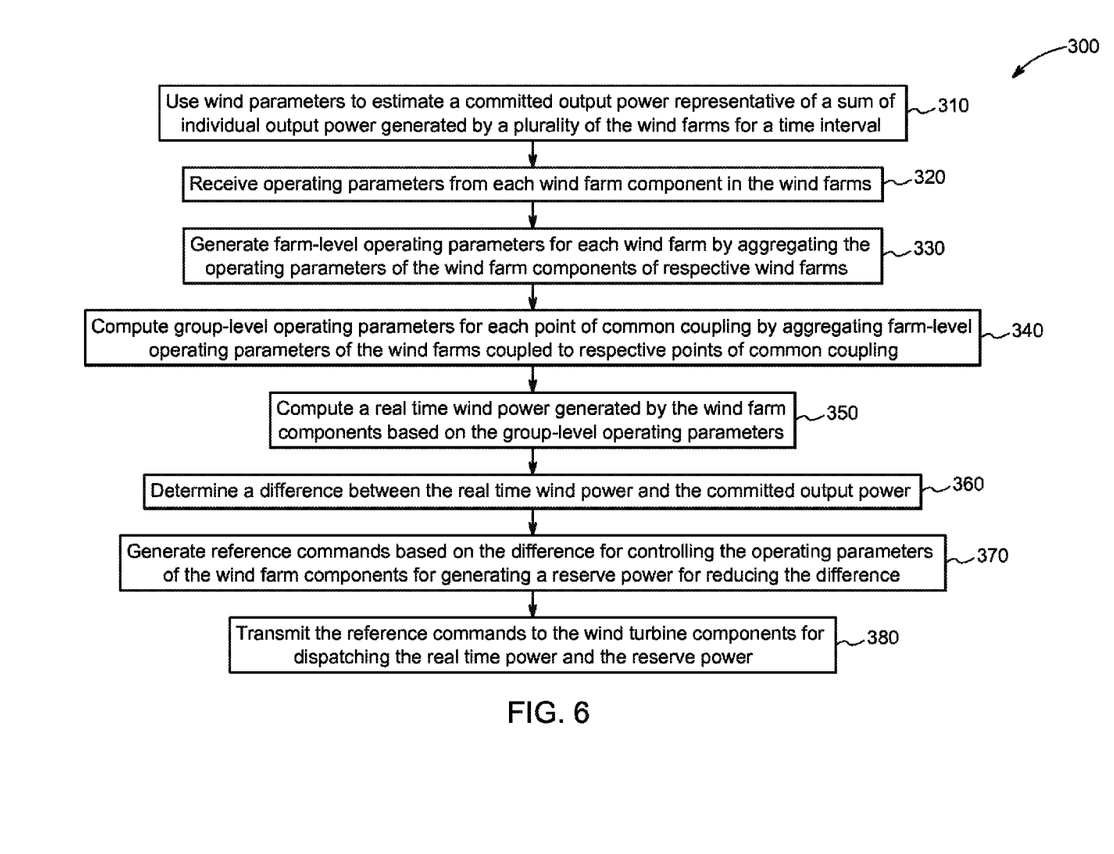
FIG. 6 is a flow chart representing steps involved in a method for dispatching a committed power in a multi farm wind power dispatch management system in accordance with an embodiment of the invention.

FIG. 6 is a flow chart representing the steps involved in a method 300 for dispatching a committed power in a multi farm wind power dispatch management system in accordance with an embodiment of the invention. At step 310, wind parameters are used to estimate a committed output power representative of a sum of individual output power expected from a plurality of the wind farms for a time interval. In one embodiment, using the wind parameters includes using wind speed and wind direction. Operating parameters from the wind farm components in the wind farms are received in step 320. In a specific embodiment, receiving the operating parameters includes receiving active power operating parameters and reactive power operating parameters from the wind farm components. In a more specific embodiment, receiving the active power operating parameters comprises receiving actual wind power operating parameters, transient wind farm reserves, and storage reserves. In another embodiment, receiving the operating parameters from each of the wind farm components comprises receiving the active power operating parameters from the active power components and receiving the reactive power operating parameters from the reactive power components. At step 330, farm-level operating parameters for the wind farms are generated by aggregating the operating parameters of the wind farm components of respective wind farms in step 330. Additionally, group-level operating parameters are computed by aggregating farm-level operating parameters of respective ones of the wind farms that are coupled to respective points of common coupling in step 340.

The method 300 further includes computing a real time output power generated by the wind farm components based on the group-level operating parameters in step 350. A difference between the real time output power and the committed output power is determined in step 360. In step 370, reference commands are generated, based on the difference, for controlling the operating parameters of the wind farm components for generating a reserve power for reducing the difference. In one embodiment, the method 300 further includes receiving a pilot bus voltage and a system frequency for generating the reference commands. After the reference commands are generated, the reference commands are transmitted for dispatching the real time power and the reserve power in step 380. In one embodiment, dispatching the reserve power includes dispatching at least one of the transient wind farm reserves, the storage reserves or a reactive power. In a more specific embodiment, dispatching the reserve power includes the steps of dispatching the transient wind farm reserve to reduce the difference, if the transient wind farm reserve is insufficient to reduce the difference, additionally or alternatively dispatching the storage reserve, and if the transient wind farm reserve and the storage reserve are insufficient to reduce the difference, additionally or alternatively dispatching the reactive power to reduce the difference.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A multi-farm wind power dispatch management system comprising:
   wind turbine dispatch controllers for controlling wind power dispatch of respective wind farm components in respective wind farms based at least in part on wind farm component operating parameters;
   wind farm dispatch management systems for receiving the respective wind farm component operating parameters and generating respective farm-level operating parameters;
   group dispatch management systems for receiving the farm-level operating parameters and generating respective group-level operating parameters, wherein each of the group dispatch management systems is coupled to at least two respective wind farm dispatch management systems of at least two respective wind farms having a respective point of common coupling with a power grid; and
   a master dispatch management system for carrying out the steps of:
      receiving the group-level operating parameters;
      computing a real time output power generated by the wind farm components based on the group-level operating parameters;
      determining a difference between the real time output power and a committed output power; and
      generating reference commands, based on the difference, for controlling at least one of the wind farm component operating parameters, the farm-level operating parameters, the group-level operating parameters, or combinations thereof to reduce the difference and dispatch the committed output power.

2. The multi-farm wind power dispatch management system of claim 1, wherein the wind farm components comprise at least one of active power components and reactive power components.

3. The multi-farm wind power dispatch management system of claim 2, wherein the active power components comprise wind turbines and energy storage elements and the reactive power components comprise at least one of static synchronous compensators (STATCOM), capacitor banks, on-load tap changers (OLTC) or a combination thereof.

4. The multi-farm wind power dispatch management system of claim 1, wherein the wind farm component operating parameters comprise active power operating parameters and reactive power operating parameters.

5. The multi-farm wind power dispatch management system of claim 4, wherein the active power operating parameters comprise an actual wind power parameter, a transient wind farm reserve, and a storage reserve.

6. The multi-farm wind power dispatch management system of claim 1, wherein the farm-level operating parameters comprise aggregated active power operating parameters and aggregated reactive power operating parameters of the wind farm components in the respective wind farm.

7. The multi-farm wind power dispatch management system of claim 1, wherein the group-level operating parameters comprise aggregated farm-level operating parameters of the wind farms coupled to the respective point of common coupling.

8. The multi-farm wind power dispatch management system of claim 1, further comprising a forecasting processor for determining the committed output power.

9. The multi-farm wind power dispatch management system of claim 8, wherein the committed output power comprises a sum of individual output power expected from each of the wind farms when operating at full capacity as estimated by the forecasting processor.

10. A method comprising:
   using wind parameters to estimate a committed output power representative of a sum of individual output power expected from a plurality of wind farms for a time interval;
   receiving operating parameters from wind farm components in the wind farms;
   generating farm-level operating parameters for the wind farms by aggregating the operating parameters of the wind farm components of respective wind farms;
   computing group-level operating parameters by aggregating farm-level operating parameters of respective ones of the wind farms that are coupled to respective points of common coupling;
   computing a real time output power generated by the wind farm components based on the group-level operating parameters;
   determining a difference between the real time output power and the committed output power;
   generating reference commands, based on the difference, for controlling the operating parameters of the wind farm components for generating a reserve power for reducing the difference; and
   transmitting the reference commands to the wind farm components for dispatching the real time power and the reserve power.

11. The method of claim 10, wherein receiving the operating parameters comprises receiving active power operating parameters and reactive power operating parameters from the wind farm components.

12. The method of claim 11, wherein receiving the active power operating parameters comprises receiving actual wind power operating parameters, transient wind farm reserves, and storage reserves.

13. The method of claim 10, wherein receiving the operating parameters from each of the wind farm components comprises receiving the active power operating parameters from the active power components and receiving the reactive power operating parameters from the reactive power components.

14. The method of claim 10, further comprising receiving a pilot bus voltage and a system frequency for generating the reference commands.

15. The method of claim 10, wherein dispatching the reserve power comprises dispatching at least one of transient wind farm reserves, storage reserves, or reactive power.

16. The method of claim 15, wherein dispatching the reserve power comprises:
   dispatching the transient wind farm reserve to reduce the difference;

if the transient wind farm reserve is insufficient to reduce the difference, additionally or alternatively dispatching the storage reserve; and if the transient wind farm reserve and the storage reserve are insufficient to reduce the difference, additionally or alternatively dispatching the reactive power to reduce the difference.

* * * * *